May 28, 1935.  R. W. FERGUSON ET AL  2,003,183
FRANGIBLE SEAL
Filed March 5, 1935
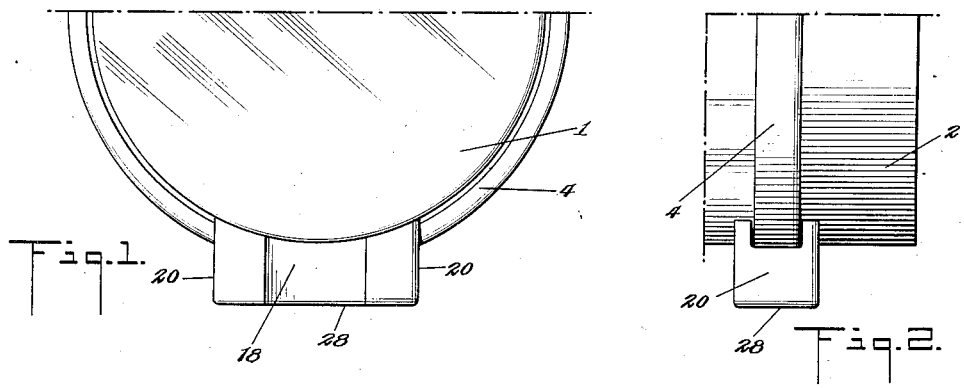
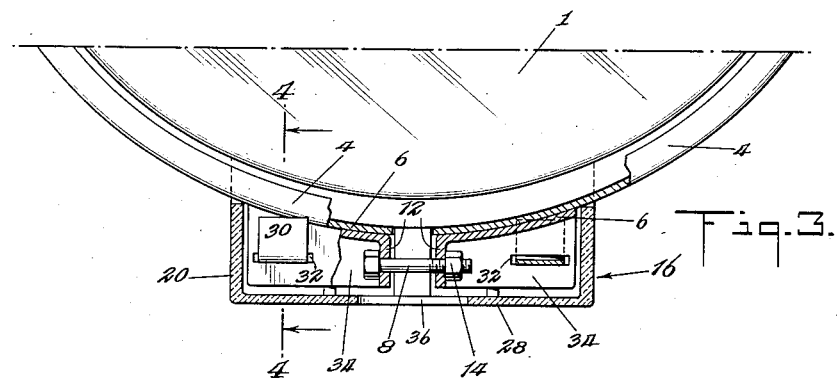
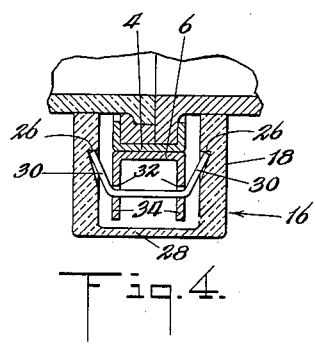
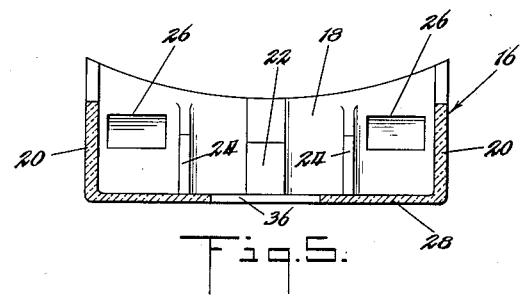
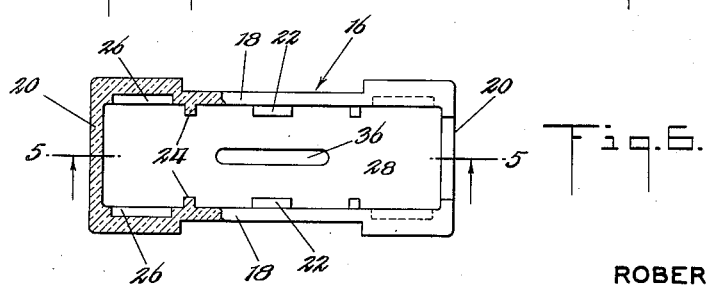
INVENTORS
ROBERT W. FERGUSON
HARRY P. SPARKES
BY THEIR ATTORNEYS
Howson and Howson Patented May 28, 1935

2,003,183

UNITED STATES PATENT OFFICE 2,003,183

FRANGIBLE SEAL

Robert W. Ferguson, Trenton, and Harry P. Sparkes, Newark, N. J., assignors of one-half to Westinghouse Electric & Manufacturing Company, East Pittsburgh, Pa., a corporation of Pennsylvania, and one-half to The Star Porcelain Company, Trenton, N. J., a corporation of New Jersey Application March 5, 1935, Serial No. 9,476

5 Claims. (Cl. 292—307)

This invention relates to meters and like devices and more particularly to sealing devices for electric meters and the like and it is an object of this invention to provide an improved sealing device for such instruments of such construction that once applied the sealing device cannot be removed without being mutilated or destroyed and of such a nature that a duplicate or imitation seal cannot be readily obtained or made. It is a further object of this invention to provide a sealing device of the type described suitable for application to the "out door" type of electric meters and which, while provided with a drain opening, is arranged to prevent release of the sealing device by the insertion of tools or other instruments through the drain opening. It is also an object of this invention to provide a sealing device of porcelain or similar frangible material which is arranged to so interlock with parts secured to the meter that the sealing device, once applied, cannot be removed without breaking or mutilating the sealing device.

In the drawing in which the preferred form of this invention is illustrated—

Fig. 1 is a view in front elevation of a sealing device constructed in accordance with this invention and shown applied to an "out door" type of meter;

Fig. 2 is a view in end elevation of the sealing device shown in Fig. 1;

Fig. 3 is a view showing the sealing device of Fig. 1 in longitudinal vertical section and showing the meter with which the seal is associated with parts broken away in order to more clearly show the relation of the sealing device to the cooperating parts of the associated meter;

Fig. 4 is a vertical transverse sectional view taken as on line 4—4 of Fig. 3;

Fig. 5 is a vertical longitudinal sectional view of the sealing device; and

Fig. 6 is a view, partly in longitudinal horizontal section and partly in plan of the sealing device.

In the drawing a seal constructed in accordance with this invention is shown in connection with a meter 1 which is connected through a socket 2 with the circuits with which the meter is associated, the joint between the meter 1 and the socket 2 being closed by a split grooved ring 4 which fits flanges or projections on the meter and socket and prevents the entry of moisture thereto. To the grooved ring 4 adjacent each end thereof there is secured a pressed lug 6 by welding or in other suitable manner. A threaded bolt 8 mounted in openings in the flanges 12 of the lugs 6 and provided with a nut 14 serves to tighten the grooved ring 4 in position on the meter and socket.

Enclosing the pressed lugs 6 is a frangible receptacle or seal 16 of porcelain or other suitable material, the receptacle 16 being substantially rectangular in shape and having the upper edges of its side walls 18 curved to fit the curvature of the meter and socket while its end walls 20 are cut away to receive the grooved ring 4. Each of the side walls 18 is reenforced by a wide centrally positioned rib 22 and narrower ribs 24 positioned between the ribs 22 and the end walls 20. Each side wall 18 is also provided with a downwardly tapered notch or recess 26 between each rib 24 and the adjacent end wall 20, the upper end wall of each notch lying parallel to the bottom wall 28 of the receptacle 16. The notches at each end of the receptacle are disposed opposite each other and receive the ends of the spring clips 30 when the receptacle is placed in position over the lugs 6. The spring clips 30 are mounted in openings 32 in the side flanges 34 of the lugs 6 and have their ends bent upwardly so that as the receptacle 16 is pushed into position on the lugs 6 the spring clips yield, permitting the application of the receptacle to the lugs 6 until the receptacle 16 is in position on the lugs 6 when the spring clips snap into the notches 26 and engage with the upper walls of the notches thereby preventing removal of the receptacle from the lugs 6.

A drain opening 36 centrally located in the bottom wall 28 permits such water as follows the grooved ring into the receptacle to drain therefrom, the drain opening 36, however, being so positioned with respect to the ribs 24 and the notches 26 that the ribs 24 prevent the releasing of the spring clips 30 from the notches 26 by means of tools or pointed instruments inserted through the drain opening 36. The receptacle 16, therefore, forms a seal which prevents tampering with the meter unless the seal is broken or mutilated in such a manner as to be apparent upon inspection and the nature and the material of the receptacle are such that duplicate receptacles or seals will not be readily available for use in replacing seals wrongfully damaged or destroyed. The seal, however, may be readily broken for authorized inspection or testing of the meter.

What is claimed is:—

1. A sealing means comprising a receptacle of frangible material having a drain opening therein, the walls of the receptacle having abutments for engaging means for holding the seal in position and means preventing access to the holding means through said drain opening.

2. A seal comprising a receptacle of frangible material having a drain opening therein, the walls of said receptacle having notches to receive means for holding the seal in position and projections on said walls preventing access to the retaining means through said drain opening.

3. A seal comprising a receptacle of frangible material having a drain opening in the bottom thereof, the side walls of the receptacle being recessed to receive means for locking the seal in position and reinforcing ribs on the walls of the receptacle preventing access to the locking means through the drain opening.

4. A seal comprising a receptacle of frangible material having a centrally positioned drain opening therein, the walls of said receptacle having abutments for engagement by retaining means and means projecting from the receptacle walls preventing access to the retaining means through the drain opening.

5. A seal comprising a rectangular receptacle of frangible material, the bottom wall thereof having a centrally positioned drain opening therein, the side walls thereof being recessed adjacent the ends thereof to receive means for locking the seal in position and projections on said side walls adjacent the recesses preventing access to the locking means through the drain opening.

ROBERT W. FERGUSON.
HARRY P. SPARKES.